US009690530B2

(12) United States Patent
Chapin et al.

(10) Patent No.: US 9,690,530 B2
(45) Date of Patent: Jun. 27, 2017

(54) MAIL PRODUCTION JOB TRACKING SYSTEM AND METHOD

(71) Applicant: Pitney Bowes Inc., Stamford, CT (US)

(72) Inventors: Susan L Chapin, Sandy Hook, CT (US); Eugene Pritchard, Brookfield, CT (US); Bruce J Barrows, Danbury, CT (US); Srikanth V Dasamandam, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 571 days.

(21) Appl. No.: 13/720,376

(22) Filed: Dec. 19, 2012

(65) Prior Publication Data

US 2013/0222845 A1 Aug. 29, 2013

Related U.S. Application Data

(60) Provisional application No. 61/586,190, filed on Jan. 13, 2012.

(51) Int. Cl.
| | |
|---|---|
| *G06F 3/12* | (2006.01) |
| *G06K 15/00* | (2006.01) |
| *G06K 15/02* | (2006.01) |
| *H04N 1/40* | (2006.01) |
| *G06Q 10/06* | (2012.01) |
| *H04N 1/00* | (2006.01) |

(Continued)

(52) U.S. Cl.
CPC ............ *G06F 3/1296* (2013.01); *G06Q 10/06* (2013.01); *G06Q 50/32* (2013.01); *H04N 1/00639* (2013.01); *H04N 9/00* (2013.01); *H04N 11/00* (2013.01)

(58) Field of Classification Search
CPC ..... G06F 3/1207; G06F 3/1259; G06F 3/1285
USPC ............ 705/7; 358/1.15, 402, 434; 709/217, 709/224; 382/103; 707/792, 104.1
See application file for complete search history.

(56) References Cited

U.S. PATENT DOCUMENTS

| | | |
|---|---|---|
| 6,205,373 B1 | 3/2001 | Hart |
| 6,266,575 B1 | 7/2001 | Anderson |

(Continued)

*Primary Examiner* — Akwasi M Sarpong
(74) *Attorney, Agent, or Firm* — Michael J. Cummings; Charles R. Malandra, Jr.; Steven J. Shapiro (57) ABSTRACT

A computer method and system to allow reconciliation of documents that were originally part of a first mail production job, but that may have been produced as part of a different second mail production job. A database stores a first record that identifies documents in the first mail production job. The record includes one or more fields indicating a production status of the documents in the first mail production job. At some point in the production process, a document is separated from what was originally defined as the first mail production job, to be instead produced as part of a second mail production job. The database further stores a second record identifying documents in the second mail production job. These records are updated to include a pointer indicating the relationship between the document and the first mail production job and the second mail production job. During mail production the production status of a document is determined. The database records are updated to record the current status of the documents. Responsive to a query regarding the status of documents originally in the first job, the pointer is used to identify the status of the document in the second job.

18 Claims, 4 Drawing Sheets

(51) Int. Cl.
*H04N 11/00* (2006.01)
*H04N 9/00* (2006.01)
*G06Q 50/32* (2012.01)

(56) References Cited

U.S. PATENT DOCUMENTS

| | | | |
|---|---|---|---|
| 6,466,935 | B1 | 10/2002 | Stuart |
| 6,747,749 | B1 | 6/2004 | Pollard |
| 7,072,947 | B1 * | 7/2006 | Knox .................... G06Q 30/02 |
| | | | 709/217 |
| 7,286,995 | B2 | 10/2007 | Mayer |
| 7,403,948 | B2 * | 7/2008 | Ghoneimy ............. G06Q 99/00 |
| | | | 707/792 |
| 7,567,941 | B2 | 7/2009 | Sagi |
| 8,049,940 | B2 | 11/2011 | Harman |
| 2003/0195781 | A1 * | 10/2003 | Sakaguchi ........... G06Q 10/063 |
| | | | 705/7.27 |
| 2003/0195782 | A1 * | 10/2003 | Sakaguchi ........... G06Q 10/063 |
| | | | 705/7.27 |
| 2005/0007624 | A1 * | 1/2005 | Henry ................ H04N 1/00244 |
| | | | 358/1.15 |
| 2007/0005762 | A1 * | 1/2007 | Knox .................. G06Q 10/107 |
| | | | 709/224 |
| 2007/0177764 | A1 * | 8/2007 | Harman ........... G07B 17/00467 |
| | | | 382/103 |
| 2007/0289956 | A1 * | 12/2007 | Knysh ............. G05B 19/41815 |
| | | | 219/121.68 |
| 2009/0037473 | A1 * | 2/2009 | Hiraguchi .......... H04N 1/00127 |

* cited by examiner

MAIL PRODUCTION JOB TRACKING SYSTEM AND METHOD

RELATED APPLICATION

This application takes priority from Provisional Application 61/586,190, filed Jan. 13, 2012, which is hereby incorporated by reference in its entirety.

TECHNICAL FIELD

The present invention relates to a method for reconciling completeness of mail runs created by high speed automated mail production systems in view of changes that may occur during a mail production process.

BACKGROUND

Systems for mass producing mail pieces are well known in the art. Such systems are typically used by organizations such as banks, insurance companies and utility companies for producing a large volume of specific mailings like billing statements, or promotional offers. The starting point for the document production process is a stream of print data generated by the organization wishing to create the mailing. The print stream may be sent to a high volume printer. Such high volume printing results in large rolls or stacks of documents, usually connected in a continuous web. The webs of documents are transported to an inserter machine to be separated into individual pages and turned into mail pieces. Examples of such inserter systems are the APS™ or MPS™ inserter systems available from Pitney Bowes Inc. of Stamford Conn.

Mail pieces are typically processed in large groups called "mail runs." Several thousand related mail pieces are typically grouped together in a mail run, with similar types of processing and inserts. Mail runs are typically tracked and managed as a group, and mail runs are conventionally submitted to a delivery service for delivery as a group.

In many respects the typical inserter system resembles a manufacturing assembly line. Sheets and other raw materials (other sheets, enclosures, and envelopes) enter the inserter system as inputs. A plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Each collation of documents processed by the inserter system typically includes a control document having coded control marks printed thereon. Scanners are located throughout the inserter system to sense documents and to allow control for processing of a particular mail piece. The coded marks may be bar codes, UPC code, or the like.

The inserter system control system is coupled to the inserter system's modular components. The control system stores data files with instructions of how individual mail pieces are to be processed. These data files are typically linked to individual mail pieces by the coded marks included on the control documents. As a collation passes through the inserter system, the coded marks on the control document are scanned and the control system directs the modular components to assemble the mail piece in accordance with the instructions for the piece.

At the various stages of the mail production and management process, sensors help to identify errors and mishandling of mail pieces. When an error is detected an error notification is typically generated. Such notification is provided to the local operator so that corrective action can be taken.

Once a finished mail piece has been formed, it is typically stacked in preparation for transfer to a carrier service, such as the U.S. Postal Service. Often, in order to receive postal discounts, it is advantageous to sort the outgoing mail in accordance postal regulations using known sorting devices.

Prior to transfer to the delivery service, completed mail runs are typically checked for quality and completeness. Because of the high volume of mail that is handled, occasionally a document submitted to the mail production equipment for processing cannot be accounted for at the output end. The unaccounted for mail pieces may have been mishandled, damaged, destroyed, or misplaced.

The prior art includes the following U.S. patents, each of which is expressly incorporated by reference as supporting background for this application: U.S. Pat. No. 6,205,373 to Hart, et. al.; U.S. Pat. No. 6,266,575 to Anderson, et. al.; U.S. Pat. No. 6,466,935 to Stuart, et. al.; U.S. Pat. No. 6,747,749 to Pollard, et. al.; U.S. Pat. No. 7,286,995 to Mayer, et. al.; U.S. Pat. No. 7,567,941 to Sagi, et. al.; and U.S. Pat. No. 8,049,940 to Harman, et. al.

SUMMARY OF THE INVENTION

This disclosure herein is directed to a computer method for tracking mail piece production of documents. The method, and corresponding system, allows reconciliation of documents that were originally part of a first mail production job, but that may have been produced as part of a different second (or any subsequently numbered) mail production job, for any number of reasons. Depending on the number of times a mail piece needs to be reprocessed, it can be part of any number of additional mail runs, for which the mail piece will be tracked using the present invention.

A database stores a first record that identifies documents in the first mail production job. The record includes one or more fields indicating a production status of the documents in the first mail production job. At some point in the production process, a document is separated from what was originally defined as the first mail production job, to be instead produced as part of a second mail production job. The database further stores a second record identifying documents in the second mail production job. These records are updated to include a pointer indicating the relationship between the document and the first mail production job and the second mail production job.

During mail production the production status of a document is determined. The database records are updated to record the current status of the documents. Responsive to a query regarding the status of documents originally in the first job, the pointer is used to identify the status of the document in the second job.

In a preferred embodiment, the step of updating one or more records to include the pointer includes updating the first record to identify a second mail production job ID and a second piece ID within the second mail production job for one or more documents in the first mail production job. The step of using the pointer may also include referring to the second mail production job ID and the second piece ID in the second record to find the status of the document originally part of the first mail production job.

The step of separating the document from the first mail production job may include instances of merging a plurality of mail production jobs to create a larger mail production job. Alternatively, the step of separating the document includes identifying that the document was damaged as part of the first mail production job, and generating the second mail production job to reprocess damaged documents. In a further embodiment, the step of separating the document from the first job includes splitting it into smaller jobs. The smaller jobs can then be merged to form the second mail production job. Split jobs can include separation of documents to be produced as physical mail pieces from documents to be produced as electronic documents. In a preferred embodiment, a mail production job includes a series of job steps for which status can be recorded and reported separately.

DETAILED DESCRIPTION

Using contemporary filebased technology for document production, each print job is accompanied by a corresponding inserter-control Job File. Damaged pieces created in the production process are reprocessed either through a closed-loop or open-loop reprint method. Each reprocessing method is mutually exclusive of the other and each offers distinct advantages and disadvantages. Unfortunately a production mailer must weigh the advantages and disadvantages of each and choose the method best suited for their business needs. In one embodiment, the method and system disclosed herein creates a new reprint method that leverages the advantages of both methods, while eliminating the inherent disadvantages of each.

Closed-Loop Method: In a closed-loop environment damaged mailpieces are reprocessed against their originating job. A new inserter-control Job File is not created and the original Job File remains open for reprocessing until all mailpieces have been successfully inserted. This is an iterative process until the job reaches 100% completion.

The advantage of this method is that it enables inserter-based job and service level tracking through 100% completion. It provides for historical life-cycle tracking of all mailpieces, regardless of how many times they were reprocessed throughout their reprinted life-cycle. The disadvantage of this environment is that each reprint iteration results in a smaller batch of work for reprocessing against the Job File. Inevitably, this impacts production efficiencies relative to printer and inserter setup times, since the number of batches requiring reprocessing remain constant to each outstanding Job File (i.e., one-to-one relationship).

Open-Loop Method: In an open-loop environment damaged mailpieces are reprocessed in a new job altogether. They are assigned new job and piece identifiers and placed in a new inserter-control Job File. Their original Job File is closed and unavailable for reprocessing, whereby it never reaches 100% completion.

The advantage to this environment is that it allows damaged mailpieces from different originating jobs to be combined together into a new Job File for reprocessing. This results in production efficiencies relative to printer and inserter setup times, since the number of individual Job Files requiring reprocessing is reduced (i.e., many-to-one relationship). The disadvantage of this environment is that it prohibits inserter-based job and service level tracking through 100% completion, since reprinted mailpieces take on a new identity within their new jobs (they are assigned new Job & Piece ID's).

The disclosed improvement incorporates a solution that provides maximum production efficiencies by allowing damaged pieces to be reprocessed as open-loop jobs, but with closed-loop linkage back to their originating jobs for inserter-based tracking and reporting through 100% completion.

This improvement includes shared software components within the inserter mail job tracking software, for example "Direct Connect" and "InSite" products from Pitney Bowes Inc. The new components provide support for a new 'Deferred' mailpiece state, and the ability to extract originating job and piece data from new Job Files and apply back to their originating Job Files.

The solution includes support for two new application fields in the inserter-control Job File—<PreviousJobID> & <PreviousPieceID>. These fields are populated by the host application that manages the creation of jobs; whereby they provide reference to the previous job and piece identifiers by which this (reprinted) piece originated from. If the piece has no prior history and is not a reprint, then the host application shall populate these two fields with ASCII spaces.

As the production tracking and management software (such as the Pitney Bowes InSite product) imports each Job File into the inserting environment, it shall interrogate these two fields for the absence of ASCII spaces—which when populated with data shall act as the indicator that the piece is associated to a reprint. InSite (or other production tracking and management software) will open the Job File referenced by the <PreviousJobID> field, and change the disposition of the piece referenced by the <PreviousPieceID> field to that of 'Deferred'. Both the inserter operating system (Direct Connect from Pitney Bowes) and production tracking and management software (InSite) shall treat pieces with a 'Deferred' disposition as finished pieces, including these into its aggregate job completion reporting metrics. This will allow jobs with deferred pieces to be tracked through 100% completion.

For those pieces whose disposition is 'Deferred', the production tracking and management software (InSite) shall maintain a reference to the new JobID and new PieceID by which the (reprinted) piece has been deferred to. From a mailpiece tracking perspective the end result is a linked listing of the historical life-cycle of each piece; from the originating JobID to each subsequent JobID by which the piece was deferred to as a result of reprint processing.

Figure 1:
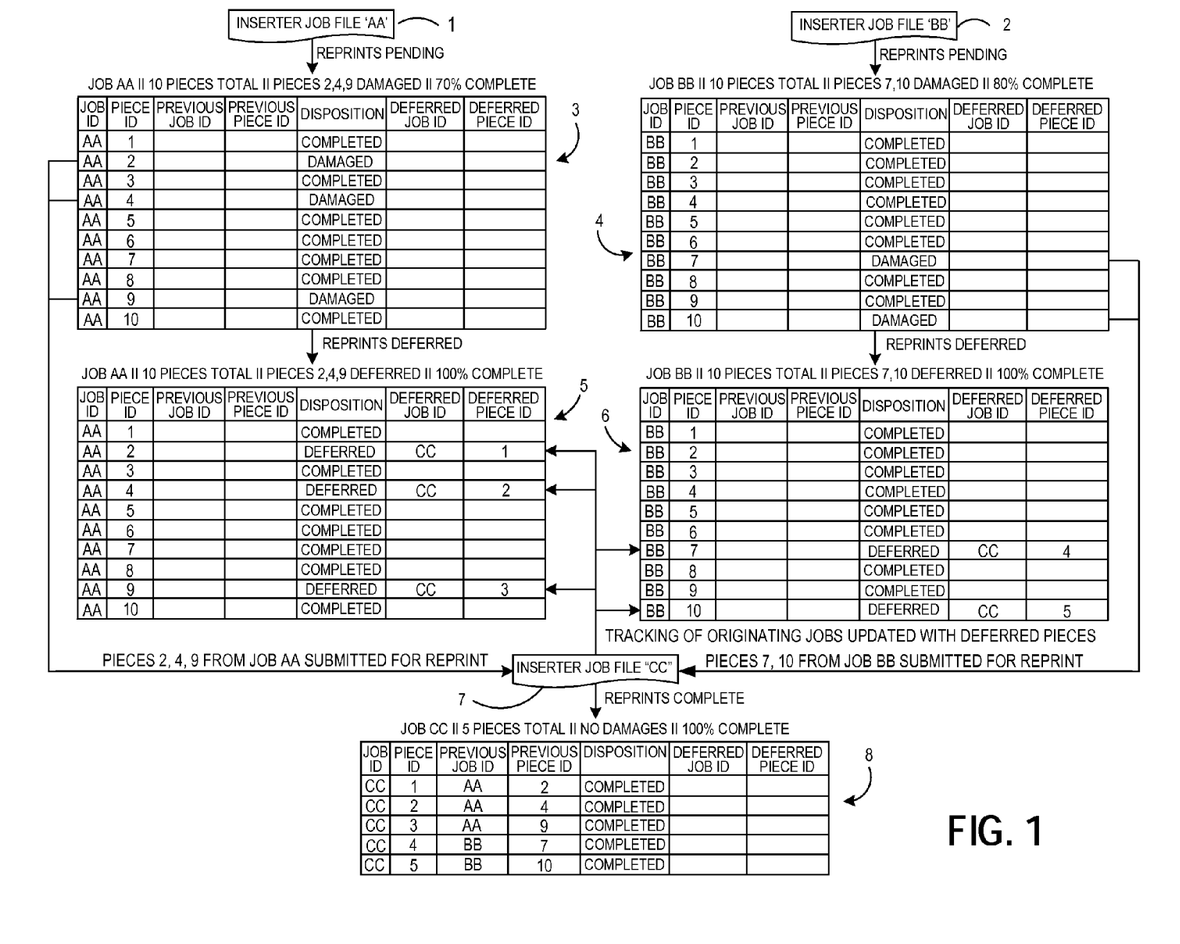
FIG. 1 shows an example of job files configured using the improved scheme described herein.

FIG. 1 shows an example of job files configured using the improved scheme described herein. In this embodiment, two inserter jobs 1 and 2 are depicted. Tables 3 and 4 show how the dispositions of jobs recorded after initial production runs. In the "disposition" column of tables 3 and 4 the "completed" or "damaged" disposition of each piece is identified. In this example, the "damaged" pieces require further attention. Thus, deferred reprint inserter job 7, further depicted in table 8, is created to process the damaged pieces from the original jobs 1 and 2. As seen in tables 5 and 6, the job files are updated to reference the deferred job 7. Each "damaged" piece gets a new "deferred job ID" and "deferred piece ID" as indicated in the columns in tables 5 and 6. These updated references serve as a pointer to the record for deferred job 8. Once deferred job 8 is run, the respective dispositions of each piece is recorded, and any query with regard to the original job can be linked to final disposition shown in table 8.

The example described above discusses how mail run tracking can be improved for tracking of damaged and reprinted pieces. However, the further examples described herein show that the improvement is more broadly applicable to tracking mail piece status anytime a mail job is broken up for any reason. The improvement allows the separate production jobs to be related back to the original client job for tracking and reconciliation purposes. This embodiment may be combined with the functionality tracking of reprint jobs, as described above, to maximize tracking capabilities.

Such an improvement can be applicable to the convention use of document factory management software (such as DFWorks from Pitney Bowes Inc.) to track a job as a complete entity from start to finish. There are many cases where a job begins as one set of documents (for example 10,000 pieces), and splits into sub-jobs for processing (8,000 pieces folded on one inserter, 1,500 pieces as flats on another inserter, 500 pieces hand-stuffed). Traditionally, the software made the customer treat each split as a separate mailrun, which limits their ability to track the status of the original (top-level) job.

In addition, there are cases where customers choose to combine smaller jobs into one larger mail run to eliminate setup time (i.e. hit start once and go rather than load multiple smaller jobs), but still want to provide client access to their job status (that is, status of each sub-job, not the combined job).

Lastly, workflows are currently defined at the client level, but more realistically vary at the job type level. Mailer customers previously created a "client" for each unique workflow (i.e. Citibank-Statements and Citibank-Checkjob as two different clients, rather than Citibank as client and Statements and Check Job as job types).

The disclosed improved data architecture for job tracking should better support a wider variation of job tracking requirements. This disclosed embodiment utilizes the following definitions: Automated Document Factory (ADF): An architecture and set of processes to manage the creation and delivery of mission-critical, high-volume digital documents. Document: A message that needs to be delivered to a recipient; the smallest unit trackable by the system. Client job: A set of documents sent to the ADF along with instructions for delivering these documents to recipients. A client job therefore represents the ADF's input. For purposes of this application, a client job is also a type of a mail production job that comes from a particular source (the client) and for which items are to be tracked. End step: The last process step in a workflow (and therefore also the last process step in all production jobs that use that workflow). Process step: A stage in the production of a document that the system should capture information about. Production job: A plan to carry out a sequence of process steps on a set of documents. All documents in a production job must complete the same process steps in the same order. (A production job is equivalent to a "mailrun."). Production job item (item): The smallest trackable component of a production job. May contain more than one document. Production plan: A sequence of one or more production jobs that will take a given client document through all the necessary process steps to its terminal step. Final step: The last process step executed on a document/production item before it leaves the ADF. Workflow: A predefined sequence of process steps that may be used for production jobs. All production jobs must follow some predefined workflow.

Figure 2:
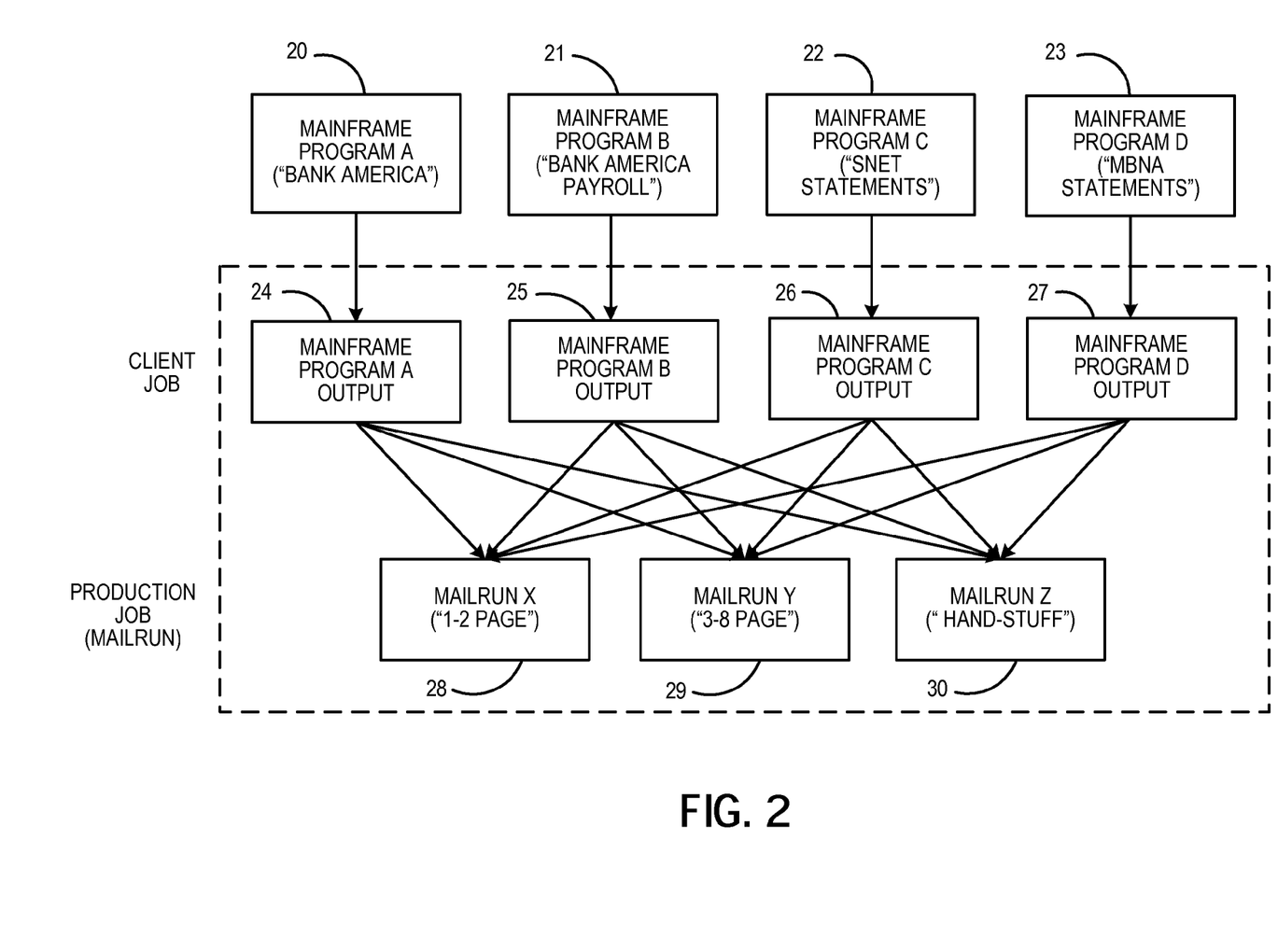
FIG. 2 is a diagram depicting relationships between different types of mail jobs for a particular embodiment.

The purpose of the enhancements described in this embodiment is to allow reports on the status and progress of client jobs when they have been split, merged, and/or commingled to produce production jobs as shown in FIG. 2.

In this example, output from different mainframe applications (20, 21, 22, 23) is commingled to group together mailpieces that have the same production characteristics. One production job could contain documents from multiple client jobs and one client job could be spread among multiple production jobs. In this example, client jobs 24, 25, 26, and 27 are split and then merged to form production runs 28, 29, and 30. These three production runs are by page count from all the documents from the four client jobs. Production jobs may also be created that group documents by output channel (print/mail vs. e-presentment), due time, postage rate class, or other characteristics.

Some fundamental concepts of client and production job tracking are as follows. Client jobs are made up of "documents" whereas production jobs are made up of "items". (A "item" is equivalent to a "mailpiece" for a production job involving printed and inserted mailpieces). All production activity, which includes data processing as well as physical production, is reported in terms of events on production jobs. Each production job has a pre-defined sequence of process steps. All items in the production job must complete each process step. (Alternatively, processing and tracking later production jobs can be achieved in accordance with the tracking scheme described at the beginning of this detailed description.) Client job progress and status are derived from production job progress and status.

Figure 3:
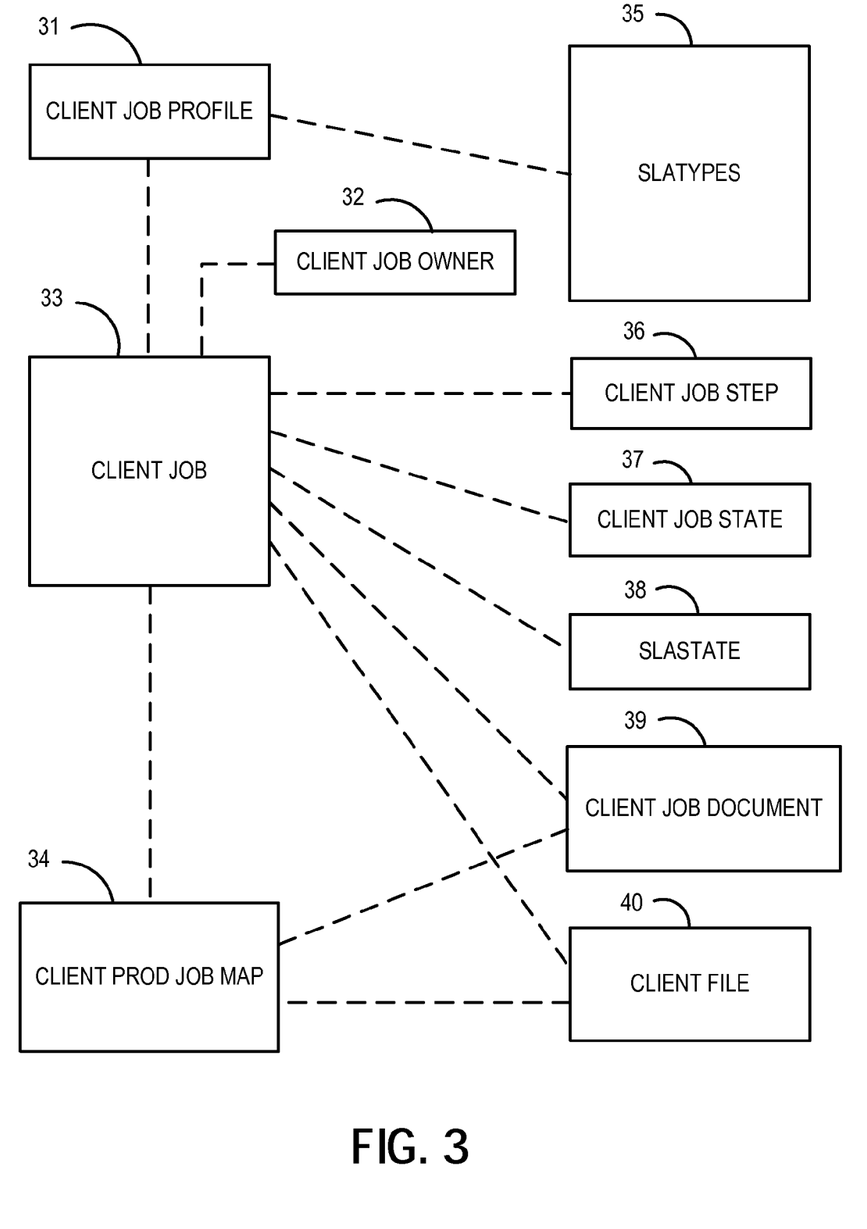
FIG. 3 depicts an exemplary database schema for implementing a preferred embodiment.

The entity-relationship diagram of FIG. 3 depicts an exemplary database schema for implementing this preferred embodiment. Table 31 represents a CLIENT_JOB_PROFILE. Data columns in table 31 include "ID," "PROFILE-NAME," "SLATYPEID," "ACTIVE," and "LAST-UPDATED." These fields provide the basic information pertaining to client jobs.

Table 32 is the CLIENT_JOB_OWNER table. This table stores all the "Clients" who submit client jobs to the system, and includes columns for the following types of data:

| COLUMN_NAME | DATA_TYPE | COMMENTS |
| --- | --- | --- |
| ID | NUMBER | Primary key of table. Auto generated by trigger and sequence associated with this table |
| NAME | VARCHAR2 | Name of Client_Job_Owner. The value specified for NAME column must be unique (in case insensitive manner) across the database |

Table 33 is the CLIENT_JOB table. This table stores all the client jobs submitted. This table will also have columns for custom fields and these columns will be added dynamically whenever needed. In the initial implementation, this table will be populated as a result processing a file received from Client job owners. Columns for the CLIENT_JOB table include:

| COLUMN_NAME | DATA_TYPE | COMMENTS |
| --- | --- | --- |
| ID | NUMBER | Primary key of table. Auto generated by trigger and sequence associated with this table |
| CLIENTJOBID | VARCHAR2 | Display JobId of Client jobs. Purpose of this field is to store a jobid value familiar to end users to be shown in reports and views |
| CLIENTJOBUNIQUEID | VARCHAR2 | Unique job id of the client job. Value specified for this column should be unique (in case insensitive manner) across the entire table |
| CLIENTJOBOWNERIDFK | NUMBER | Indicates Client_Job_Owner who owns the client job. Value specified for this column is foreign key to Client_Job_Owner table |
| CREATIONTIME | DATE | Indicates the time when the client job was created |
| CLIENTJOBSTATEIDFK | NUMBER | Indicates client job state. Value specified for this column is foreign key to ClientJobState table |
| CLIENTFILEIDFK | NUMBER | Indicates the client file based on which the client job was created. Value specified for this column is foreign key to Client_File table. This column is primarily intended for troubleshooting purpose. |
| SLASTATEIDFK | NUMBER | Indicates the SLA State of client job. Value specified for this column is foreign key to SLASTATE table |
| DUETIME | DATE | Indicates the time by which the client job must be completed |
| WARNINGTIME | DATE | Indicates the time when the client job will enter in Warning SLA State |
| SLASTARTTIME | DATE | Indicates the time when the client job's SLA Clock will start |
| SLATYPEIDFK | NUMBER | Foreign key to SLATYPES table. Defines SLA rules for computing DUETIME from SLASTARTTIME. Not used if due time is provided directly. |
| CLOSEDTIME | DATE | Indicates the time when the client job was closed. |
| INACTIVE | CHAR | Indicates whether this client job is active or not. Default value for this column is NULL and valid values for this column are Y or NULL. |
| DEFINEDDOCUMENTS | NUMBER | Indicates the number of documents in the client job. |
| PLANNEDDOCUMENTS | NUMBER | Indicates the number of documents in the client job to be produced (planned) at least at one final step. If a document is to be produced at multiple output channels, then it will account only once. |
| DELIVERDOCUMENTS | NUMBER | Indicates the total number of documents in the client job to be produced (planned) at all the final steps. If a document is to be produced at two output channels, then it will count here twice. |
| FINISHEDDOCUMENTS | NUMBER | Indicates the total number of documents in the client job actually finished to final steps. |
| LASTUPDATED | DATE | Indicates the most recent time when this job was modified. |

Table 37 is the CLIENTJOBSTATE table. This table stores all the valid job states for the Client jobs.

| COLUMN_NAME | DATA_TYPE | COMMENTS |
| --- | --- | --- |
| ID | NUMBER | Primary key of table |
| JOBSTATE | VARCHAR2 | Name of the JobState of the Client jobs |

Following job states are supported for client jobs.

| ID | JOBSTATE |
| --- | --- |
| 1 | Ready |
| 2 | Processing |
| 3 | Completed |
| 4 | Closed |
| 5 | OnHold |

Table 39 is the CLIENT_JOB_DOCUMENT table. This table stores documents contained in client jobs. This table will also have columns for custom fields and these columns will be added dynamically whenever needed. In the initial implementation, this table will be populated as a result of processing of a file received from Client job owners.

| COLUMN_NAME | DATA_TYPE | COMMENTS |
| --- | --- | --- |
| ID | NUMBER | Primary key of table. Auto generated by trigger and sequence associated with this table |
| CLIENTJOBIDFK | NUMBER | Indicates the Client Job for which this document belongs to. Value specified for this column is foreign key to CLIENT_JOB table |

-continued

| COLUMN_NAME | DATA_TYPE | COMMENTS |
|---|---|---|
| DOCUMENTNUMBER | NUMBER | Indicates the document number of the document, 1 . . . N where N is the number of documents in the client job. |
| DOCUMENTID | VARCHAR2 | Indicates some kind of identifier for the document typically used by end users to identify the document. Purpose of this field is to store a value familiar to end users to be shown in reports and views |
| PAGECOUNT | NUMBER | Indicates the total number of pages in the document. May be zero if unknown or if multiple documents on a page. |
| CLIENTFILEIDFK | NUMBER | Indicates the client file from which this document information was loaded from. Value specified for this column is foreign key to Client_File table. This column is primarily intended for troubleshooting purpose. |
| LINENUMBER | NUMBER | Indicates line number within the CLIENTFILEIDFK file from which this document information was loaded from. This column is primarily intended for troubleshooting purpose. |

Table 34 is the CLIENT_PROD_JOB_MAP table. This table contains one row for each document for each production job in which the document is produced. Purpose of this table is to identify the production job and item corresponding to each client job and document and vice versa.

| COLUMN_NAME | DATA_TYPE | COMMENTS |
|---|---|---|
| ID | NUMBER | Primary key of table. Auto generated by trigger and sequence associated with this table |
| CLIENTJOBIDFK | NUMBER | Indicates the Client Job of the document referred to by this row. Value specified for this column is foreign key to CLIENT_JOB table |
| MAILRUNIDFK | NUMBER | Indicates the mailrun (production job) of the item referred to by this row. Value specified for this column is foreign key to MAILRUN table. |
| DOCUMENTNUMBER | NUMBER | Document number, 1 . . . N, within client job of the document referred to by this row. |
| RECNUM | NUMBER | Item number of the item within the production job which is here being associated with a particular client job document. |
| INACTIVE | CHAR | Set to 'Y' if production plan no longer calls for producing the referenced production job item in order to produce the corresponding client job document. |
| CLIENTFILEIDFK | NUMBER | Indicates the client file from which this mapping information was loaded. Value specified for this column is foreign key to Client_File table. This column is primarily intended for troubleshooting purpose. |
| LINENUMBER | NUMBER | Indicates line number within the CLIENTFILEIDFK file from which this mapping information was loaded from. This column is primarily intended for troubleshooting purpose. |

As an alternative to table 34 the CLIENT_PROD_JOB_SUMMARY_MAP table may be used. Each row of this table associates a range of client documents with a range of production items. This table can be used instead of CLIENT_PROD_JOB_MAP (34) in cases where clients jobs have been split or merged, but not commingled, to produce production jobs. Rows also exist in CLIENT_PROD_JOB_SUMMARY_MAP corresponding to those in CLIENT_PROD_JOB_MAP as a shorthand way of finding client-to-production job relationships.

| COLUMN_NAME | DATA_TYPE | COMMENTS |
|---|---|---|
| ID | NUMBER | Primary key of table. Auto generated by trigger and sequence associated with this table |
| CLIENTJOBIDFK | NUMBER | Indicates the Client Job of the documents referred to by this row. Value specified for this column is foreign key to CLIENT_JOB table |
| STARTDOCUMENT | NUMBER | Lowest-numbered client job document referred to by this row. |
| ENDDOCUMENT | NUMBER | Highest-numbered client job document referred to by this row. |

| COLUMN_NAME | DATA_TYPE | COMMENTS |
| --- | --- | --- |
| MAILRUNIDFK | NUMBER | Indicates the mailrun (production job) of the items referred to by this row. Value specified for this column is foreign key to MAILRUN table. |
| STARTITEM | NUMBER | Lowest-numbered production job item referred to by this row. |
| ENDITEM | NUMBER | Highest-numbered production job item referred to by this row. |
| INACTIVE | CHAR | Set to 'Y' if production plan no longer calls for producing the referenced production job items in order to produce the corresponding client job documents. |
| SUMMARYONLY | CHAR | Set to 'Y' if there is no corresponding data in CLIENT_PROD_JOB_MAP. |
| DOCUMENTCOUNT | NUMBER | Number of documents represented by this row. In most cases (unless there are two copies of a document within the same production job), the number of client job documents will equal the number of production job items. If SUMMARYONLY = 'Y', DOCUMENTCOUNT will equal ENDITEM − STARTITEM + 1. |
| CLIENTFILEIDFK | NUMBER | Indicates the client file from which this mapping information was loaded. Value specified for this column is foreign key to Client_File table. This column is primarily intended for troubleshooting purpose. |
| LINENUMBER | NUMBER | Indicates line number within the CLIENTFILEIDFK file from which this mapping information was loaded from. This column is primarily intended for troubleshooting purpose. |

The PAM_XDATA table (not shown in FIG. 3) is a database table containing data about mailpiece production activity. The contents may be derived from production events on individual mailpieces (Mailpiece X of production job Z successfully processed) or from single inputs that describe events on multiple mailpieces (Mailpieces X through Y of production job Z successfully processed). PAM_XDATA works like a fact table in a star schema and contains columns for mailpiece event attributes such as the machine that mailpieces were processed on, the production job they were part of, and the operator who performed the processing. It also contains columns for measured numeric data such as the number of mailpieces that match the attributes pertaining to a given row, the total number of pages in those mailpieces, the total postage applied to the mailpieces, etc.

Table 36 is the CLIENT_JOB_STEP table. This table stores the process steps for client jobs. This table is essentially a roll up table containing number of delivery/finished documents at each process step. Data from PAM_XDATA and XACTION_DETAILS tables will be used to generate data for this table. Note: If the same process step appears as a final step and as an intermediate step in the same client job, there will be two rows for that step in CLIENT_JOB_STEP. Example: Suppose the Print step is sometimes followed by Insert and sometimes is a final step (work is printed and then shipped) within the same client job. In this case there will be two rows in CLIENT_JOB_STEP for Print, one with FINALSTEP='Y' and one with FINALSTEP=NULL, for that client job.

| COLUMN_NAME | DATA_TYPE | COMMENTS |
| --- | --- | --- |
| ID | NUMBER | Primary key of table. Auto generated by trigger and sequence associated with this table |
| CLIENTJOBIDFK | NUMBER | Indicates the Client Job for which this process step belongs to |
| STEPID | VARCHAR2 | Stores the process step name. This column should have the value specified in PROCESS_STEP.NAME column |
| PROCESSSTEPIDFK | NUMBER | Indicates process step of client job. Value specified for this column is foreign key to PROCESS_STEP table |
| DELIVERDOCUMENTS | NUMBER | Indicates the total number of documents to be produced (planned) at this step of the client job |
| FINISHEDDOCUMENTS | NUMBER | Indicates the total number of documents actually produced at this step of the client job |
| FINALSTEP | CHAR(1) | Y means that the documents represented by this row are completed when they are finished on the step represented by this row: There are no more process steps to follow for these documents. |

Table 40 is the CLIENT_FILE table. This table stores all the client job related files received by the mail run tracking system and records the time when the file was received/processed by the mail run tracking system.

| COLUMN_NAME | DATA_TYPE | COMMENTS |
|---|---|---|
| ID | NUMBER | Primary key of table. Auto generated by trigger and sequence associated with this table |
| FILETYPE | VARCHAR2 | Type of client job file. The value in this field could be anything and is primarily used for troubleshooting/tracability purposes |
| FILENAME | VARCHAR2 | Full file path (directory + file name) of client job file received by DFWorks |
| FILETIMESTAMP | DATE | Last modified timestamp of client job file received by DFWorks |
| PROCESSINGSTARTTIME | DATE | Time when DFWorks started processing the client job file |
| PROCESSINGENDTIME | DATE | Time when DFWorks finished processing the client job file |

The database schema may also include an XACTION_DETAILS table. This table contains breakdown of finished/processed pieces by every client job within one particular transaction. This table has a n:1 relationship to PAM_XDATA table.

| COLUMN_NAME | DATA_TYPE | COMMENTS |
|---|---|---|
| ID | NUMBER | Primary key of table. Auto generated by trigger and sequence associated with this table |
| XACTON | NUMBER | Indicates the xaction for which this row is tied to. Value specified in this column is a foreign key back to PAM_XDATA |
| CLIENTJOBIDFK | NUMBER | Value specified for this column is foreign key to CLIENT_JOB table |
| FINISHEDDOCS | NUMBER | Indicates the number of finished documents of a particular client job in that specific transaction |
| PROCESSEDDOCS | NUMBER | Indicates the number of processed documents of a particular client job in that specific transaction |

The database schema may also include a CLIENT_PROGRESS_XACTIONS table. This table identifies rows of the PAM_XDATA table that have been added or changed and which should be used to update client job progress.

| COLUMN_NAME | DATA_TYPE | COMMENTS |
|---|---|---|
| ID | NUMBER | Primary key of table. Auto generated by trigger and sequence associated with this table |
| XACTON | NUMBER | Indicates the xaction which has been added or updated. Value specified in this column is a foreign key back to PAM_XDATA |

Tables 35 and 38 include information about service level requirements (SLA's) pertaining to particular jobs.

Figure 4:
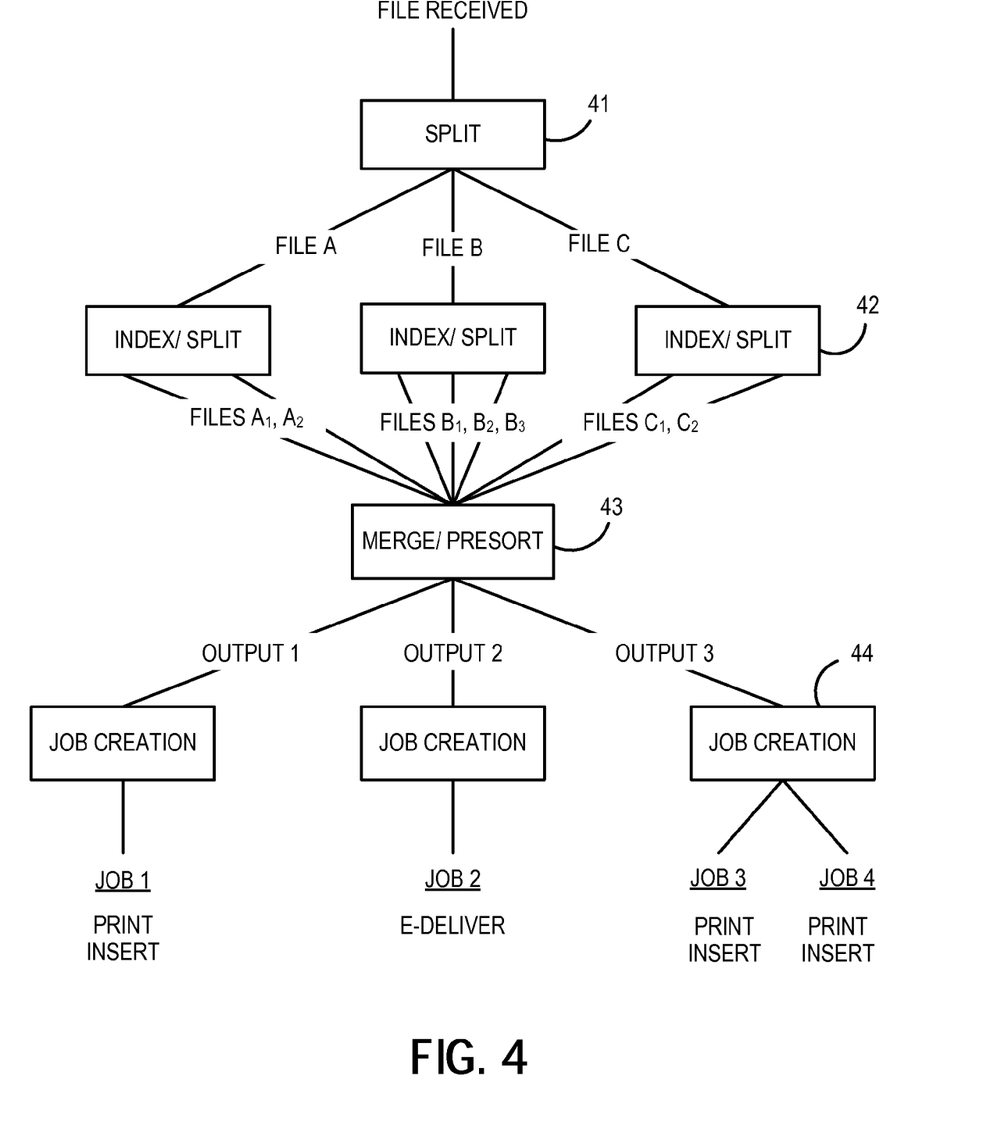
FIG. 4 depicts an example of client job tracking using the improvements in a preferred embodiment.

FIG. 4 depicts an example of client job tracking using the improvements in the preferred embodiment. FIG. 4 shows processing that might occur on a file that contains documents for the automated document factory to deliver. This file is shown entering the system at "File Received" at the top of the diagram and will correspond to the client job. Split step 41: In this step, the file is split for convenience (it may be large). Index/Split step 42: File is indexed. There may be additional splits here. Merge step 43: Multiple files are combined and commingled. Result is divided up by output channel & type (6×9, Flats, E-Delivery, for example). Each output potentially contains documents from each of the input files. Job Creation step 44: Actual jobs as seen on production floor are created here. These may be subdivisions of the outputs of the Merge/Presort step. Note: In this example documents are not being combined in the same envelope: There is just one document per mailpiece.

One process step is needed for each stage where document production activity is to be tracked. If all one wants to do is track production steps like Print and Insert back to the client job, a minimal approach would be to create the client job at the original input and create production jobs at just the Print, Insert, and E-Deliver steps. But to illustrate the flexibility of the steps tracking model the following steps will be included: split; index (includes secondary split); merge; JobCreation; Print Insert (final step: Items completing this step need no more steps); and E-Deliver (final step: Items completing this step need no more steps).

This section describes the data feeds the job tracking system would require to track a client job through the process steps and workflows described above. In general the following information is needed: (1) for the client job, a file or data feed that provides information about the client job; (2) for each production job, a file or data feed that provides information about the production job, including how each item maps to one or more client job documents. (Client-to-production job maps may be at the item level or summary level); (3) for each production job, one or more progress files indicating which items in the production job have completed which process steps. Files may be at the item level or summary level.

At split step 41 the software that receives the incoming file does the following:

(1) Opens the received file and creates client job. The original client job has 18 documents.

(2) Reads through the received file. As it does so, creates three sub-files (A, B, C), with a production job corresponding to each. Writes to the database: production job A, workflow "Preprocessing", 10 items; Client/Production Job Map: client job, documents 1-10=Production job A, items 1-10; Production Job B, workflow "Preprocessing", 5 items; Client/Production Job Map: Client job, documents 11-15=Production job B, items 1-5; Production Job C, workflow "Preprocessing", 3 items. Client/Production Job Map: Client job, documents 16-18=Production job C, items 1-3.

(3) As each production job is complete, supplies progress information to the tracking system. Data entries include: Item Events (progress file): Job A Finished 1-10 on Split step; Item Events (progress file): Job B Finished 1-5 on Split step; Item Events (progress file): Job C Finished 1-3 on Split step.

After the above. the tracking system will show the client job 100% complete for the Split step and will show three production jobs with workflow "Preprocessing" 100% complete.

Index Step 42. The software performing the Index step 42 does the following:

(1) Opens one received file: File A.
(2) For the first document, creates production job: File A1;
(3) Writes to the tracking system: Production Job A1, workflow "Presort", 0 items (unknown).
(4) Indexes/composes documents into Job A1. After 6 documents a decision is made to start a new file.
(5) Writes to the tracking system: Update Production Job A1, size=6 items; Client/Production Job Map: Client job, documents 1-6=Production Job A1, items 1-6; Item Events (progress file): Job A1 Finished 1-6 on Index step.

Repeat steps (2)-(5) for the rest of file A, creating A2. Then repeat (1)-(5) for the remaining files B and C. After all the work for this step has been done, the tracking system will show seven "Presort" production jobs with status 100% for the Index step and 0% for the Merge step. The client job will show 100% complete for the Index step.

Merge Step 43. The software performing the Merge step 43 does the following:

(1) Merges & presorts input files A1, A2, B1, B2, B3, C1, and C2.
(2) As each file is consumed outputs progress to the tracking software for Merge step: Item Events (progress file): Job A1 Finished 1-6 on Merge step; Item Events (progress file): Job A2 Finished 1-4 on Merge step; Item Events (progress file): B1 Finished 1-3 on Merge step; etc.
(3) Creates new production jobs for output. Writes to the tracking software: Production Job OUTPUT 1, workflow "JobCreation", 4 items; Production Job OUTPUT 2, workflow "JobCreation", 6 items; Production Job OUTPUT 3, workflow "JobCreation", 12 items.
(4) Write Client/Production Job Maps to the database: Example:

| Production Job | Item | Client Job | Document |
|---|---|---|---|
| OUTPUT 1 | 1 | B | 2 |
| OUTPUT 1 | 2 | A | 8 |
| OUTPUT 1 | 3 | A | 4 |
| OUTPUT 1 | 4 | C | 3 |

(After all the work for this step has been done, the tracking system will show: Client Job with steps Split, Index, and Merge 100% complete; seven production jobs of workflow Split/Merge that are 100% complete; three production jobs of workflow JobCreation with known size but 0% progress on JobCreation step; (note that there are 22 items to complete in the JobCreation step (11+7+4) even though there were only 18 documents in the original file. This is because there is some multi-channel output: 4 documents are being both printed and e-delivered).

JobCreation Step 44. The software performing the Job-Creation step 44 does the following:

(1) Reads one input file (starts with File A).
(2) If # of items to produce is >10, split. In this example will split File C into two sub-jobs and will write to the tracking system: Production Job 3, workflow "PrintMail", 10 items; Production Job 4, workflow "PrintMail", 2 items; Client/Production Job Map: Must be item-level as when OUTPUT 3 was created due to the fact that the merged jobs contain commingled documents. Another option might be, to define new production jobs in terms of existing production jobs: Production job 3 items 1-10=OUTPUT 3 items 1-10; Production Job 4 items 1-2=Production job OUTPUT 3 items 11-12; Item Events (progress file): File A Finished 1-4 on JobCreation step; Item Events (progress file): File B Finished 1-6 on JobCreation step; Item Events (progress file): File C Finished 1-12 on JobCreation step.

At this point the mail production tracking system has: three production jobs of workflow "Preprocessing" all 100% complete at the Split step; seven production jobs of workflow "Presort" all 100% complete at the Index and Merge steps; three production jobs of workflow "JobCreation" all 100% complete at the JobCreation step; three production jobs of workflow PrintMail with 0% progress on steps; and one production job of workflow E-Deliver with 0% progress.

Client job reporting will show the following totals: documents planned to completion (PLANNEDDOCUMENTS)=18, (this counts each source document only once and means that all source documents have a production plan through to at least one final step); documents to deliver (DELIVERDOCUMENTS)=22 (this means that as a result of executing the plan 22 outputs will be produced) (these can be broken down by process step for each client job); finished documents (FINISHEDDOCUMENTS)=0 (this is because no document has finished either Insert or E-Delivery at this point). Subsequent activity will include reporting of progress on Print, Insert, and E-Deliver steps which will complete the PrintMail and E-Deliver production jobs and eventually complete the client job as well.

This example is only one of many ways to collect and organize job tracking data in order to take advantage of the basic improvements described. Although the invention has been described with respect to preferred embodiments thereof, it will be understood by those skilled in the art that the foregoing and various other changes, omissions and deviations in the form and detail thereof may be made without departing from the scope of this invention. The disclosed system operates on conventional automated document factory equipment and computers. For example, one or more inserter systems will be coupled to a server computer that receives data indicating the status of the machines, and of documents being processed on the machines. The server computers include a processor and memory that are configured with a database and corresponding software to form the systems that have been described above.

What is claimed is:

1. A computer method for reconciliation of mail production jobs, the method comprising:
   tracking mail piece production of documents that are originally part of a first mail production job, but that may be produced as part of a different second mail production job, the step of tracking comprising:
   in a database, storing a first record identifying documents in the first mail production job, the first record further including one or more fields indicating a production status of the documents in the first mail production job;
   separating a document from the first mail production job to be produced as part of a second mail production job;
   in the database, storing a second record identifying documents in the second mail production job;

in the database, updating one or more records pertaining to the document to include a pointer indicating the relationship between the document and the first mail production job and the second mail production job;

determining a status of the document during mail production in the second mail production job;

updating the one or more records with a status of the document; and responsive to a query regarding the status of documents originally in the first job, using the pointer to identify the status of the document in the second job, and providing that status pursuant to the query;

wherein the step of updating one or more records to include the pointer includes updating the first record to identify a second mall production job ID and a second piece ID within the second mail production job for one or more documents in the first mail production job.

2. The method of claim 1 wherein the step of using the pointer includes referring to the second mail production job ID and the second piece ID in the second record to find the status of the document originally part of the first mail production job.

3. The method of claim 1 wherein the step of separating the document to be produced as part of the second mail production job includes merging a plurality of mail production jobs to create a larger mail production job.

4. The method of claim 1 wherein the step of separating the document to be produced as part of the second mail production job includes identifying that the document was damaged as part of the first mail production job, and generating the second mail production job to reprocess a plurality of damaged documents.

5. The method of claim 1 wherein the step of separating the document to be produced as part of the second mail production job includes splitting the first mail production job into smaller jobs.

6. The method of claim 5 wherein the step of separating the document to be produced as part of the second mail production job further includes merging smaller mail production jobs to form the second mail production job.

7. The method of claim 5 wherein the step of splitting the first mail production job into smaller jobs includes separating documents to be produced as physical mail pieces from documents to be produced as electronic documents.

8. The method of claim 1 wherein the second mail production job includes a series of job steps and the step of updating the status of the document includes recording status for individual job steps.

9. The method of claim 1 wherein the first mail production job is a client job, and the step of updating one or more records in the database includes recording a relationship between documents in the client job and in the second mail production job.

10. A computerized system for reconciliation of mail production jobs, the system comprising:

a processor;

a memory, the memory including a database storing a first record identifying documents in the first mail production job, the first record further including one or more fields indicating a production status of the documents in the first mail production job, the database further storing a second record identifying documents in a second mail production job;

wherein the processor is configured to perform the following steps for tracking mail piece production of documents that are originally part of a first mail production job, but that may be produced as part of a different second mail production job:

interact with the database to separate a document from the first mail production job to be produced as part of a second mail production job, update one or more records in the database pertaining to the document to include a pointer indicating the relationship between the document and the first mail production job and the second mail production job;

determine a status of the document during mail production in the second mail production job;

update the one or more records with a status of the document; and responsive to a query regarding the status of documents originally in the first job, using the pointer to identify the status of the document in the second job, and providing that status pursuant to the query;

wherein the processor is configured to perform the step of updating one or more records to include the pointer by updating the first record to identify a second mail production job ID and a second piece ID within the second mail production job for one or more documents in the first mail production job.

11. The system of claim 10 wherein the processor is configured to perform the step of using the pointer by referring to the second mail production job ID and the second piece ID in the second record to find the status of the document originally part of the first mail production job.

12. The system of claim 10 wherein the processor is configured to perform the step of separating the document to be produced as part of the second mail production job by merging a plurality of mail production jobs to create a larger mail production job.

13. The system of claim 10 wherein the processor is configured to perform the step of separating the document to be produced as part of the second mail production job by identifying that the document was damaged as part of the first mail production job, and generating the second mail production job to reprocess a plurality of damaged documents.

14. The system of claim 10 wherein the processor is configured to perform the step of separating the document to be produced as part of the second mail production job by splitting the first mail production job into smaller jobs.

15. The system of claim 14 wherein the processor is configured to perform the step of separating the document to be produced as part of the second mail production job further by merging smaller mail production jobs to form the second mail production job.

16. The system of claim 14 wherein the processor is configured to perform the step of splitting the first mail production job into smaller jobs by separating document documents to be produced as physical mail pieces from documents to be produced as electronic documents.

17. The system of claim 10 wherein the second mail production job includes a series of job steps and the processor is configured to perform the step of updating the status of the document by recording status for individual job steps.

18. The system of claim 10 wherein the first mail production job is a client job, and the processor is configured to perform the step of updating one or more records in the database by recording a relationship between documents in the client job and in the second mail production job.

* * * * *